United States Patent
Minelli

(10) Patent No.: US 11,946,417 B2
(45) Date of Patent: Apr. 2, 2024

(54) COMBINATION OF A GAS TURBINE ENGINE AND A POWER ELECTRONICS

(71) Applicant: ROLLS-ROYCE plc, London (GB)

(72) Inventor: Andrea Minelli, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/096,146

(22) Filed: Jan. 12, 2023

(65) Prior Publication Data
US 2023/0243305 A1  Aug. 3, 2023

(30) Foreign Application Priority Data

Feb. 2, 2022 (GB) ..................................... 2201316

(51) Int. Cl.
*F02C 7/16* (2006.01)
*F02C 3/06* (2006.01)
(Continued)

(52) U.S. Cl.
CPC ............... *F02C 7/16* (2013.01); *F02C 3/06* (2013.01); *F02C 7/06* (2013.01); *F02C 7/22* (2013.01); *F05D 2220/323* (2013.01); *F05D 2240/35* (2013.01); *F05D 2260/213* (2013.01); *F05D 2260/232* (2013.01); *F05D 2260/98* (2013.01)

(58) Field of Classification Search
CPC ...... F02C 7/16; F02C 7/06; F02C 7/22; F02C 7/224; F02C 3/06; F05D 2220/323; F05D 2240/35; F05D 2260/213; F05D 2260/232; F05D 2260/98
See application file for complete search history.

(56) References Cited

U.S. PATENT DOCUMENTS

| 4,104,873 A | 8/1978 | Coffinberry |
| 6,182,435 B1 | 2/2001 | Niggemann et al. |

(Continued)

FOREIGN PATENT DOCUMENTS

| EP | 2 806 163 A1 | 11/2014 |
| EP | 2 881 563 A1 | 6/2015 |

(Continued)

OTHER PUBLICATIONS

Jul. 28, 2022 Search Report issued in United Kingdom Patent Application No. GB2201313.0.

(Continued)

*Primary Examiner* — Steven M Sutherland
(74) *Attorney, Agent, or Firm* — Oliff PLC

(57) ABSTRACT

A combination of a gas turbine engine and power electronics, includes an engine core and oil circuit to cool and lubricate bearings of the engine core, and a fuel circuit for supplying fuel to the combustor. The fuel circuit includes a low pressure pump for pressurising the fuel to a low pressure, and a high pressure pump to receive the low pressure fuel and increase the pressure to a high pressure for supply to a fuel metering system and the combustor. The engine includes a fuel-oil heat exchanger having a fuel side on the fuel circuit between an outlet of the low pressure pump and an inlet of the high pressure pump, and an oil side on the oil circuit to transfer heat from the oil circuit to the fuel circuit. The power electronics transfers heat to a cooling flow formed by a portion of the low pressure fuel.

15 Claims, 3 Drawing Sheets

(51) Int. Cl.
*F02C 7/06* (2006.01)
*F02C 7/22* (2006.01)

(56) References Cited

U.S. PATENT DOCUMENTS

| | | | |
|---|---|---|---|
| 7,941,993 B2 | 5/2011 | Siebert | |
| 8,522,572 B2 | 9/2013 | Coffinberry et al. | |
| 10,215,097 B2 | 2/2019 | Miller et al. | |
| 10,443,503 B2 | 10/2019 | Alecu et al. | |
| 10,752,374 B1* | 8/2020 | Lui | B64D 37/34 |
| 10,865,713 B2 | 12/2020 | Dyer | |
| 11,085,376 B2 | 8/2021 | Klonowski et al. | |
| 11,391,210 B2 | 7/2022 | Ribarov | |
| 11,492,970 B2 | 11/2022 | Rambo | |
| 2001/0027641 A1 | 10/2001 | Clarke et al. | |
| 2012/0247117 A1 | 10/2012 | Gagne et al. | |
| 2016/0201558 A1* | 7/2016 | Pal | F02C 9/00 60/39.83 |
| 2016/0281656 A1 | 9/2016 | Alecu et al. | |
| 2017/0058693 A1 | 3/2017 | Epstein | |
| 2017/0167391 A1* | 6/2017 | Demelas | F02C 9/30 |
| 2020/0332714 A1 | 10/2020 | Ribarov | |
| 2020/0355121 A1 | 11/2020 | O'Meallie et al. | |
| 2020/0385127 A1 | 12/2020 | Devault | |

FOREIGN PATENT DOCUMENTS

| | | |
|---|---|---|
| EP | 3 043 046 A1 | 7/2016 |
| EP | 3 597 886 A1 | 1/2020 |
| EP | 3 904 658 A1 | 11/2021 |
| EP | 4019752 A1 | 6/2022 |
| FR | 3 104 641 A1 | 6/2021 |
| GB | 2580591 A | 7/2020 |
| WO | 2009/140100 A1 | 11/2009 |

OTHER PUBLICATIONS

Jul. 29, 2022 Search Report issued in United Kingdom Application No. GB2201316.3.
U.S. Appl. No. 18/096,178, filed Jan. 12, 2023 on behalf of Andrea Minelli.
Pang etal., Study on Heat Transfer Performance of Antifreeze-R134a Heat Exchanger (ARHEx), Nov. 23, 2020, Energies 2020, 13, 6129; doi:10.3390/en13226129, www.mdpi.com/journal/energies (Year: 2020).
Paul Evans, Thermodynamic properties of refrigerant R134a, Aug. 5, 2017, The Engineering Mindset, https://theengineeringmindset.com/thermodynamic-properties-refrigerant-r-134a/ (Year: 2017).
Engineering Toolbox, Methanol—Thermophysical Properties, https://www.engineeringtoolbox.com/methanol-methyl-alcohol-properties-CH3OH-d_2031.html (Year: 2018).
May 24, 2023 Office Action Issued in U.S. Appl. No. 18/096,178.
Jun. 21, 2023 extended Search Report issued in European Patent Application No. 23150896.1.
Jun. 23, 2023 extended Search Report issued in European Patent Application No. 23150897.9.
Oct. 6, 2023 Office Action issued in U.S. Appl. No. 18/096,178.

* cited by examiner

COMBINATION OF A GAS TURBINE ENGINE AND A POWER ELECTRONICS

CROSS-REFERENCE TO RELATED APPLICATIONS

This specification is based upon and claims the benefit of priority from UK Patent Application Number 2201316.3 filed on Feb. 2, 2022, the entire contents of which are incorporated herein by reference.

BACKGROUND

1. Field of the Disclosure

The present invention relates to a combination of a gas turbine engine and a power electronics for powering aircraft and/or engine systems.

2. Description of the Related Art

Gas turbine engines include sophisticated thermal management systems to control the temperatures of components. In particular, heat is rejected into the oil of the engine oil system used for cooling and lubricating engine components. The oil in the oil system is cooled in turn by transferring heat to engine fuel and/or air flows.

A further source of cooling demand can derive from the thermal management of electrical components, such as power electronics, which form an increasingly important part of aircraft and/or engine systems. Failure to meet increased cooling demands can result in less reliable or worsened performance of such systems. In particular, the performance of power electronics for powering aircraft and/or engine systems (e.g. the cabin blower system) can be affected by temperature changes, and therefore reliably controlling its temperature during all phases of aircraft operation is important.

Conventional thermal management solutions for electrical components include air cooling. For example, cold bypass duct air flow produced by an engine fan can be used as a heat sink to reject heat into via, for example, an air-cooled heat exchanger and/or cooling fins projecting from a container within which the power electronics is located. However, due to the increased cooling demands of a more electrified aircraft, the surface area requirement of such an air-cooled heat exchanger can become increasingly unviable to integrate into an engine.

These problems can be exacerbated when the gas turbine engine includes a power gear box (PGB) to drive a fan, the PGB putting a further cooling demand on the thermal management system of the engine.

The present invention has been devised in light of the above considerations.

The present invention is at least partly based on a recognition that the cooling demand of a power electronics for powering aircraft and/or engine systems can be met by making use of the engine fuel circuit, even when this circuit is also used for thermal management of the oil in the engine oil circuit.

SUMMARY

Thus, in a first aspect, the present invention provides a combination of a gas turbine engine and a power electronics for powering aircraft and/or engine systems,
wherein the engine includes:
an engine core comprising a turbine, a combustor, a compressor, and a core shaft connecting the turbine to the compressor;
an oil circuit configured to cool and lubricate bearings of the engine core;
a fuel circuit for supplying fuel to the combustor, the fuel circuit including:
a low pressure pump for pressurising the fuel to a low pressure;
a high pressure pump configured to receive the low pressure fuel and increase the pressure to a high pressure for supply to a fuel metering system and thence to the combustor; and
a fuel-oil heat exchanger having a fuel side on the fuel circuit between an outlet of the low pressure pump and an inlet of the high pressure pump, and an oil side on the oil circuit to transfer heat from the oil circuit to the fuel circuit; and
wherein the power electronics is configured to transfer heat produced by the power electronics to a cooling flow formed by a portion of the low pressure fuel, the cooling flow being extracted from and returned to the fuel circuit between the outlet of the low pressure pump and the fuel side of the fuel-oil heat exchanger.

Thus, by adopting this arrangement, the cooling demand of the power electronics can be met by implementing a fuel-cooled solution. In particular, the power electronics is configured to reject heat into a cooling flow formed by a portion of the low pressure fuel, the cooling flow being extracted from and returned to the fuel circuit between the outlet of the low pressure low pressure pump and the fuel side of the fuel-oil heat exchanger. Extracting the fuel from and returning it to the fuel circuit at this position has multiple advantages. Firstly, relative to using a cooling flow formed by fuel upstream of the low pressure pump, it avoids compromising the suction capability of the low pressure pump as the cooling flow (having an increased temperature after cooling the power electronics) is not returned to the inlet of the low pressure pump. Secondly, the heat transfer from the power electronics into the fuel is performed before the generally greater heat transfer into the fuel from the fuel-oil heat exchanger. Were these two heat transfer processes performed in the opposite order, the cooling of the power electronics might be compromised. Thirdly, relative to a different possible arrangement where the power electronics is located on a main fuel line of the fuel circuit such that all the fuel from the low pressure pump passes first through the power electronics and then through the fuel-oil heat exchanger, the risk of overcooling and excessive pressure drops is reduced. Finally, using the fuel circuit to cool the power electronics can achieve a heat transfer rate of as much as around 10 kW, which is generally sufficient to meet the cooling demand of the power electronics with a much smaller engine footprint compared to conventional air-cooled solutions.

Optional features of the invention will now be set out. These are applicable singly or in any combination with any aspect of the invention.

The power electronics may be for powering an aircraft cabin blower system.

The power electronics may further include internal passages for flow therethrough of the cooling flow. Alternatively or additionally, the power electronics may further include one or more cold plates cooled by the cooling flow for extracting heat produced by the power electronics. Such internal passages and/or cold plates can enhance the transfer of heat from the power electronics to the cooling flow, thereby more reliably and effectively controlling the power electronics' temperature.

The gas turbine engine may further include a cooling pump configured to drive the extraction and return of the cooling flow. Such a cooling pump can more reliably control the flow rate of the cooling flow, and thus more reliably and effectively control the power electronics' temperature.

According to one option, the pump may conveniently be an electric pump. Alternatively, the pump may be an ejector pump using a spill flow formed from a portion of the high pressure fuel produced by the high pressure pump to drive the extraction and return of the cooling flow. The spill flow can then be returned to the fuel circuit between the outlet of the low pressure pump and the fuel side of the fuel-oil heat exchanger by mixing with the cooling flow. For example, the ejector pump may use a spill flow taken from the high pressure fuel upstream of the fuel metering system. Such an ejector pump typically has a small footprint and is thus easy to integrate into the engine. If an ejector pump is used, the cooling flow may enter the ejector pump after cooling the power electronics, i.e. the ejector pump can be downstream of the power electronics. This location of the ejector pump avoids having the relatively high temperature fuel from the spill flow being used to cool the power electronics.

The gas turbine engine may further include a valve to control the amount of spill flow used to drive the ejector pump. In this way the flow rate of the cooling flow can in turn be controlled to meet the cooling demand of the power electronics. Additionally, the impact of the spill flow on the fuel flow capacity of the high pressure pump can be reduced.

The power electronics may be housed in a thermally insulating container. This can allow a greater level of control of the ambient temperature in the vicinity of the power electronics.

The engine may further include an air-cooled heat exchanger, such as a surface cooler, configured to transfer heat produced by the power electronics to an air flow produced by the engine. For example, when the gas turbine engine is a turbofan engine having a bypass duct for a bypass airflow outside the engine core, the air flow may be the bypass duct air flow produced by the fan. In combination with the fuel cooling discussed above, this can increase the cooling capacity of the engine.

As noted elsewhere herein, the present disclosure relates to a gas turbine engine. Such a gas turbine engine comprises an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, the combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds), for example in the range of from 1800 K to 1950 K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments illustrating the principles of the invention will now be discussed with reference to the accompanying figures in which.

DETAILED DESCRIPTION OF THE DISCLOSURE

Aspects and embodiments of the present invention will now be discussed with reference to the accompanying figures. Further aspects and embodiments will be apparent to those skilled in the art. All documents mentioned in this text are incorporated herein by reference.

Figure 1:
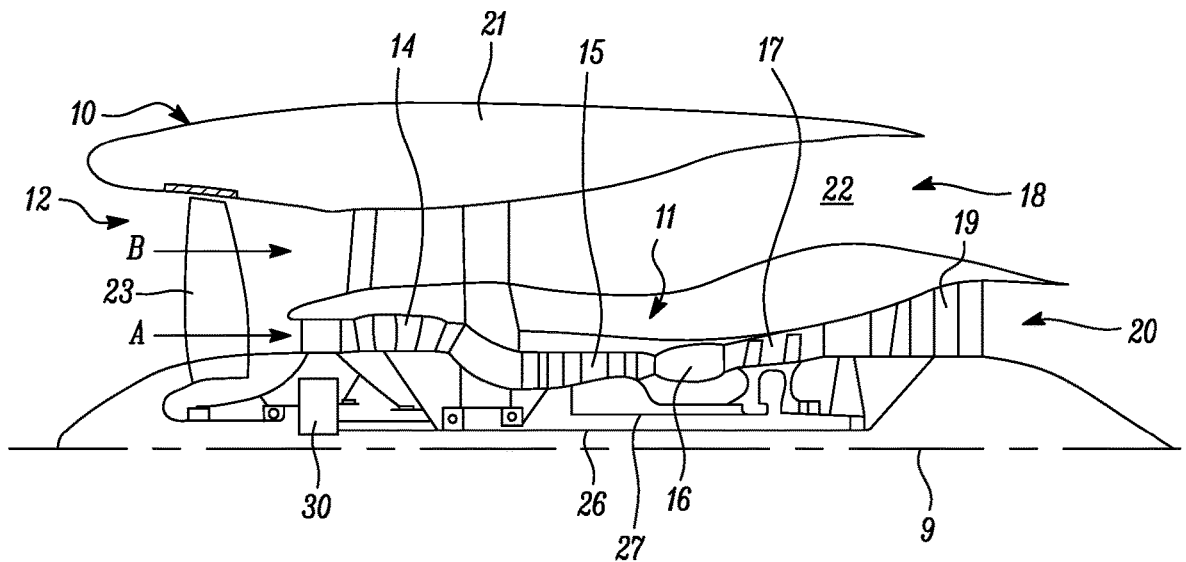
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
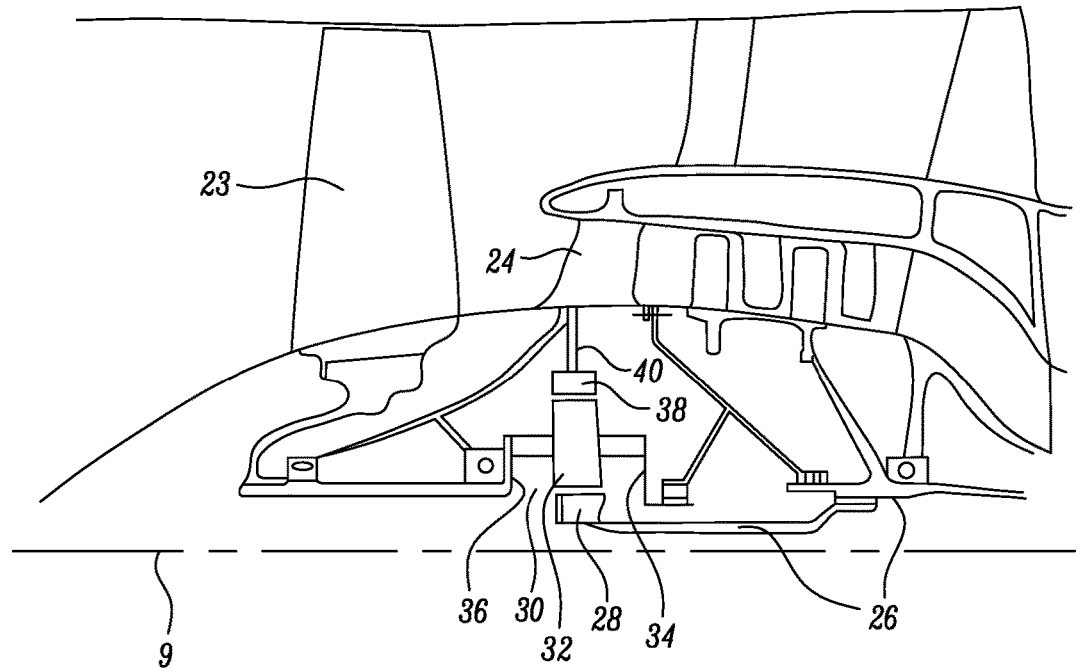
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
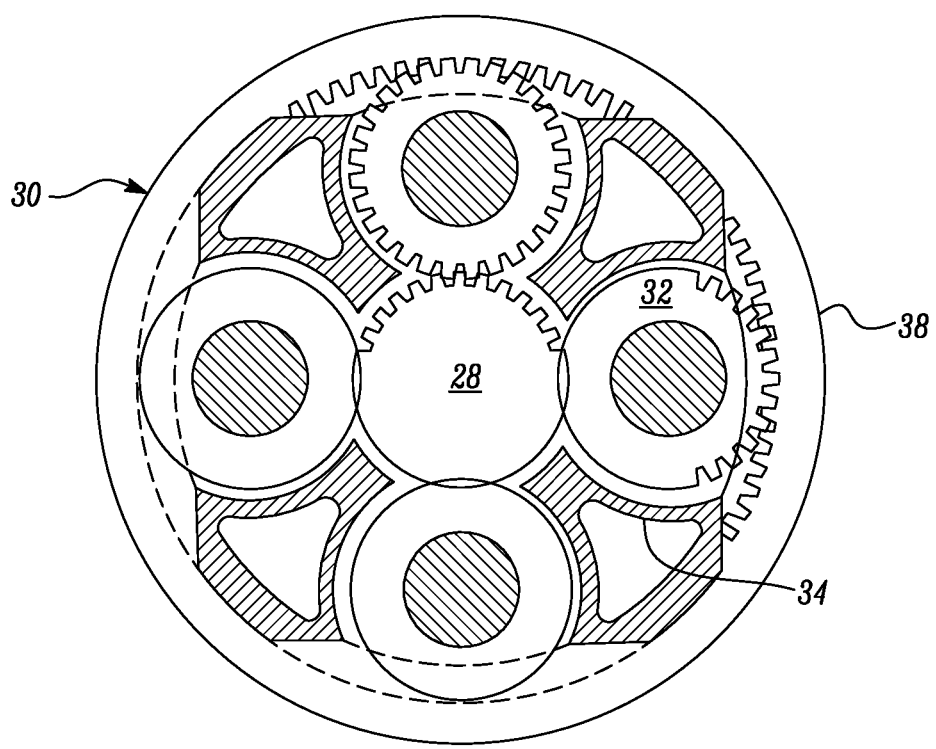
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
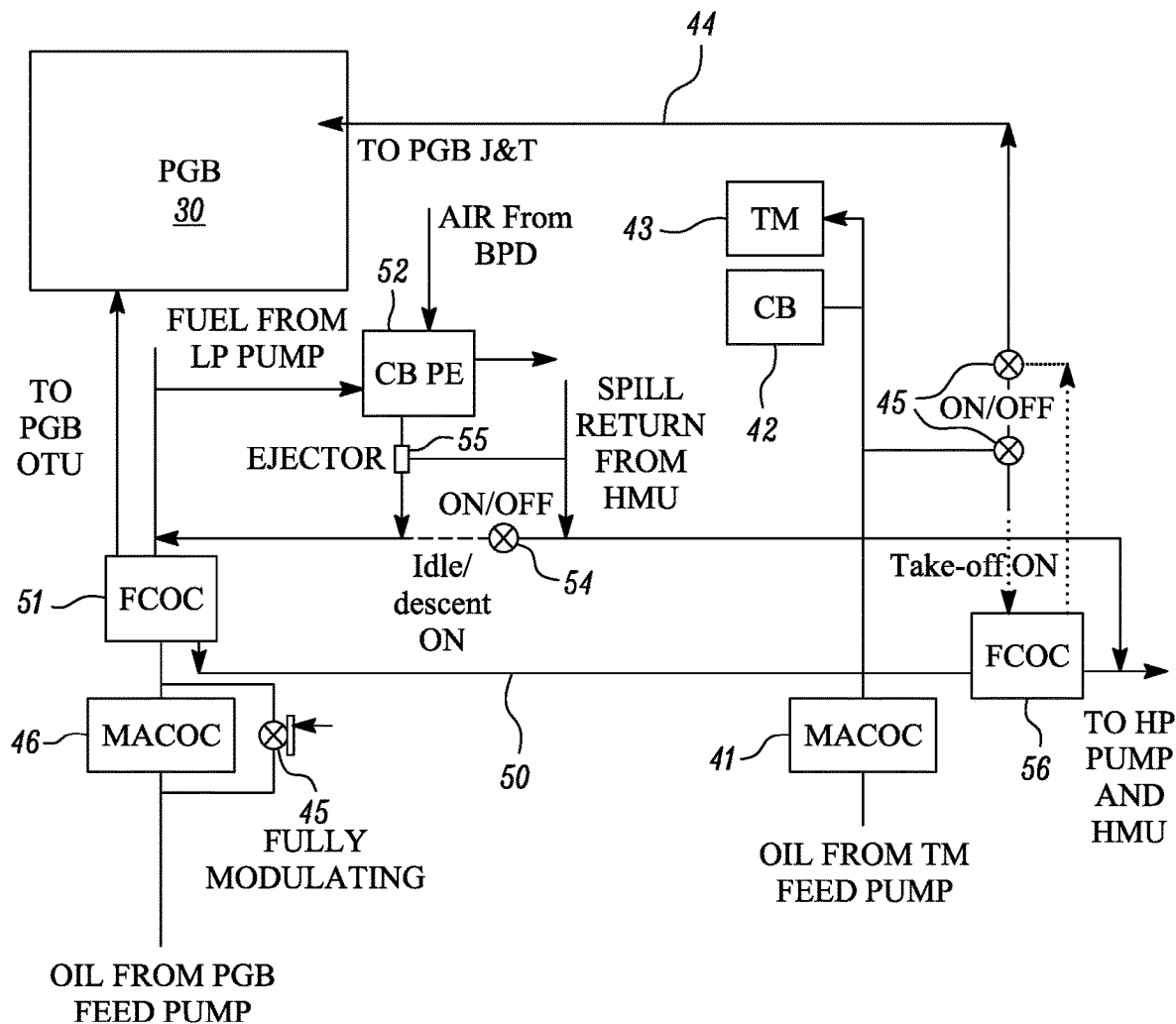
FIG. 4 is a schematic view of an oil circuit and a fuel circuit of a gas turbine engine.

The gas turbine engine 10 of FIGS. 1 and 2 further has: an oil circuit 44 configured to cool and lubricate bearings of the engine core 11, and bearings and gears of the power gear box (PGB) 30, and a fuel circuit 50 for supplying fuel to the combustor 16. Both circuits 44, 50 are schematically shown in FIG. 4.

During engine operation, oil from an engine oil tank provides a supply of oil for the oil circuit 44. Typically the oil is drawn from the tank through a strainer, and then pumped through a filter using an oil pump having a pressure-limiting valve (none of which is shown in FIG. 4). The oil then flows to the oil sides of various heat exchangers 41, 46, 51, 56 before being used to cool and lubricate the bearings etc. of the cabin blower (CB) 42, turbomachinery (TM) 43 (i.e. the turbines 17, 19 and the compressors 14, 15) and the PGB 30. Valves 45 control and direct the oil flow as required. Having performed its lubricating and cooling function, the oil is directed to sumps and returned to the oil tank by scavenge pumps.

To prevent the oil overheating such that it would fail to adequately perform its cooling and lubricating functions, heat from the oil circuit 44 is transferred to fluid heat sinks, i.e. fuel and air flows at the heat exchangers 41, 46, 51, 56. More particularly, heat is rejected from the oil circuit 44 to cooling air flows via matrix air-cooled oil coolers (MACOCs) 41, 46 rejecting heat from the oil to bypass duct air produced by the fan 23. Alternatively, the heat may be rejected via other types of air-cooled heat exchangers, such as surface air-cooled oil coolers (SACOCs). Further heat is transferred from the oil circuit to the fuel circuit 50 via one or more fuel-cooled oil coolers (FCOCs), in this case a first FCOC 51 and second FCOC 56, the first FCOC 51 being upstream of the second FCOC 56 on the fuel circuit. The transfer of heat from the oil circuit also protects the fuel from forming fuel-borne ice particles. Furthermore, the exchange of heat between the oil 44 and fuel 50 circuits helps to reduce thermodynamic losses in the engine 10.

The fuel circuit 50 supplies fuel from an aircraft fuel tank to the combustor 16 for combustion. During operation, fuel drawn from the aircraft fuel tank is pressurised to a low pressure by a low pressure (LP) pump. The low pressure fuel is then directed to a high pressure (HP) pump which increases the pressure of the fuel to a high pressure and supplies it to a fuel metering system which controls the engine-consumed flow in response to a fuel demand indicated by an electronic engine controller (EEC). In the example of FIG. 4, the fuel metering system is provided by a hydro-mechanical unit (HMU). The fuel sides of the first 51 and the second 56 FCOCs are between an outlet of the LP pump and an inlet of the HP pump.

A portion of the low pressure fuel produced by the LP pump is extracted from the fuel circuit 50 and sent to a power electronics (PE) 52 as a cooling flow, and then returned to the fuel circuit upstream of the fuel side of the first FCOC 51. The PE in this example is for powering the cabin blower (CB) system of the aircraft, but other types of PE which may require such active cooling include PEs for powering aircraft control actuators. The PE can be mounted to the engine or it may be mounted at a convenient location on the aircraft at a distance from the engine.

A part of the HP fuel produced by the HP pump (e.g. taken from a fuel-washed filter of the HMU upstream of the HMU's fuel metering valve) is returned to the fuel circuit 50 between the outlet of the LP pump and the inlet of the HP pump as a spill flow. At least a portion of this spill flow is supplied to an ejector pump 55, to drive the cooling flow through the pump and the PE 52. The amount of fuel spill flow used to drive the ejector pump is controlled by a valve 54 to meet the cooling demand of the PE. Having passed through the ejector pump, the cooling flow (mixed with the portion of the spill flow used to drive the pump) is returned to the fuel circuit upstream of the fuel side of the first FCOC 51. The spill flow is at a higher temperature than the cooling flow, and thus preferably the ejector pump is located downstream of the PE to avoid the portion of the spill flow used to drive the pump reducing the cooling effectiveness of the cooling flow. To enhance the heat transfer between the PE and the cooling flow, the PE can be provided with internal passages through which the cooling flow can pass and/or with one or more cold plates cooled by the cooling flow. Additionally, as shown in FIG. 4, cooling of the PE 52 can be supplemented by an air-cooled heat exchanger transferring heat produced by the PE to the bypass duct (BPD) air flow B produced by the fan 23. For example, the air-cooled heat exchanger can be implemented as a MACOC or a SACOC.

The cooling arrangement discussed above can achieve a heat transfer rate of as much as about 10 kW to cool the PE 52, while requiring a relatively small the engine footprint.

Furthermore, it avoids compromising the suction capability of the LP pump as the cooling flow (having an increased temperature after cooling the PE) is not returned to the inlet of the LP pump. Also, relative to a different possible arrangement where the PE is located on the main fuel line of the fuel circuit such that all the fuel from the LP pump passes first through the PE and then through the first FCOC 51, the risk of overcooling and excessive pressure drops is reduced. In addition, the heat transfer from the PE into the fuel is performed before the generally greater heat transfer into the fuel from the first FCOC 51. Were the first FCOC located before the PE on the fuel circuit, the cooling of the PE could be compromised. On the other hand, the relatively small amount of heat transferred into the fuel circuit from the PE compared to that transferred in from the oil circuit does not significantly affect the ability of the fuel circuit in the first FCOC 51 to cool the oil in the oil circuit.

Modifications of the fuel circuit shown in FIG. 4 are possible. For example, the pump driving the cooling flow can be an electric pump instead of the ejector pump 55. If the cooling pump is an electric pump, it can be located either before or after the PE as it does not rely on a fuel spill flow from the HMU to drive the cooling flow. Additionally, electric pumps can be easily controlled. However, they typically have a larger engine footprint compared to ejector pumps and can be less reliable due to their greater number of moving components.

The PE 52 can be housed in a thermally insulating container, which enables a greater level of control of the ambient temperature around the PE.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by the use of the antecedent "about," it will be understood that the particular value forms another embodiment. The term "about" in relation to a numerical value is optional and means for example +/−10%.

I claim:

1. A combination of a gas turbine engine and a-power electronics for powering aircraft and/or engine systems,
wherein the gas turbine engine includes:
an engine core comprising a turbine, a combustor, a compressor, and a core shaft connecting the turbine to the compressor;
an oil circuit configured to cool and lubricate bearings of the engine core;
a fuel circuit for supplying fuel to the combustor, the fuel circuit including:
a low pressure pump for pressurising the fuel to a low pressure; and
a high pressure pump configured to receive low pressure fuel from the low pressure pump and increase the pressure to a high pressure for supply to a fuel metering system and thence to the combustor; and
a fuel-oil heat exchanger having a fuel side on the fuel circuit between an outlet of the low pressure pump and an inlet of the high pressure pump, and an oil side on the oil circuit to transfer heat from the oil circuit to the fuel circuit; and
wherein the power electronics is configured to transfer heat produced by the power electronics to a cooling flow formed by a portion of the low pressure fuel from the low pressure pump, the cooling flow being extracted from and returned to the fuel circuit between the outlet of the low pressure pump and the fuel side of the fuel-oil heat exchanger,
wherein the gas turbine engine further includes:
a fan located upstream of the engine core, the fan comprising a plurality of fan blades; and
a bypass duct for a bypass airflow produced by the fan outside the engine core,
wherein the gas turbine engine further includes an air-cooled heat exchanger configured to transfer heat produced by the power electronics to an air flow produced by the gas turbine engine.

2. The combination according to claim 1, wherein the power electronics further includes internal passages for flow therethrough of the cooling flow.

3. The combination according to claim 1, wherein the power electronics further includes one or more cold plates cooled by the cooling flow for extracting heat produced by the power electronics.

4. The combination according to claim 1, wherein the gas turbine engine further includes a cooling pump configured to drive the extraction and return of the cooling flow.

5. The combination according to claim 4, wherein the cooling pump is an electric pump.

6. The combination according to claim 4, wherein the cooling pump is an ejector pump using a spill flow formed from a portion of the high pressure fuel from the high pressure pump to drive the extraction and return of the cooling flow.

7. The combination according to claim 6, wherein the cooling flow enters the ejector pump after cooling the power electronics.

8. The combination according to claim 6, wherein the gas turbine engine further includes a valve to control the amount of spill flow used to drive the ejector pump.

9. The combination according to claim 1, wherein the power electronics are housed in a thermally insulating container.

10. The combination according to claim 1, wherein the gas turbine engine further includes:
  a gearbox that receives an input from the core shaft and outputs drive to the fan so as to drive the fan at a lower rotational speed than the core shaft.

11. The combination according to claim 1, wherein the air flow is the bypass duct air flow.

12. The combination according to claim 1, wherein:
  the turbine is a first turbine, the compressor is a first compressor, and the core shaft is a first core shaft;
  the engine core further comprises a second turbine, a second compressor, and a second core shaft connecting the second turbine to the second compressor; and
  the second turbine, second compressor, and second core shaft are arranged to rotate at a higher rotational speed than the first core shaft.

13. A combination of a gas turbine engine and power electronics for powering aircraft and/or engine systems, wherein the gas turbine engine includes:
  an engine core comprising a turbine, a combustor, a compressor, and a core shaft connecting the turbine to the compressor;
  an oil circuit configured to cool and lubricate bearings of the engine core;
  a fuel circuit for supplying fuel to the combustor, the fuel circuit including:
    a low pressure pump for pressurising the fuel to a low pressure; and
    a high pressure pump configured to receive low pressure fuel from the low pressure pump and increase the pressure to a high pressure for supply to a fuel metering system and thence to the combustor; and
  a fuel-oil heat exchanger having a fuel side on the fuel circuit between an outlet of the low pressure pump and an inlet of the high pressure pump, and an oil side on the oil circuit to transfer heat from the oil circuit to the fuel circuit; and
  wherein the power electronics is configured to transfer heat produced by the power electronics to a cooling flow formed by a portion of the low pressure fuel from the low pressure pump, the cooling flow being extracted from and returned to the fuel circuit between the outlet of the low pressure pump and the fuel side of the fuel-oil heat exchanger,
  wherein the gas turbine engine further includes a cooling pump configured to drive the extraction and return of the cooling flow, and
  wherein the cooling pump is an ejector pump using a spill flow formed from a portion of the high pressure fuel from the high pressure pump to drive the extraction and return of the cooling flow.

14. The combination according to claim 13, wherein the cooling flow enters the ejector pump after cooling the power electronics.

15. The combination according to claim 13, wherein the gas turbine engine further includes a valve to control the amount of spill flow used to drive the ejector pump.

* * * * *